(12) United States Patent
Koyanagi et al.

(10) Patent No.: US 9,018,795 B2
(45) Date of Patent: Apr. 28, 2015

(54) ALTERNATING CURRENT AUTONOMOUS DISTRIBUTED AC POWER SYSTEM

(75) Inventors: Kaoru Koyanagi, Tokyo (JP); Satoshi Nagata, Tokyo (JP)

(73) Assignee: VPEC, Inc., Tokyo (JP)

( * ) Notice: Subject to any disclaimer, the term of this patent is extended or adjusted under 35 U.S.C. 154(b) by 902 days.

(21) Appl. No.: 13/120,038

(22) PCT Filed: Mar. 12, 2009

(86) PCT No.: PCT/JP2009/054814
§ 371 (c)(1),
(2), (4) Date: Apr. 5, 2011

(87) PCT Pub. No.: WO2010/103650
PCT Pub. Date: Sep. 16, 2010

(65) Prior Publication Data
US 2011/0175443 A1 Jul. 21, 2011

(51) Int. Cl.
*H02J 1/12* (2006.01)
*H02J 3/32* (2006.01)
*H02J 3/38* (2006.01)

(52) U.S. Cl.
CPC .. *H02J 3/32* (2013.01); *Y02E 70/30* (2013.01); *H02J 3/383* (2013.01); *H02J 3/386* (2013.01); *H02J 3/381* (2013.01); *H02J 3/387* (2013.01); *Y02E 10/563* (2013.01); *Y02E 10/566* (2013.01); *Y02E 10/763* (2013.01)

(58) Field of Classification Search
USPC .......................................................... 307/21
See application file for complete search history.

(56) References Cited

U.S. PATENT DOCUMENTS

| | | | | |
|---|---|---|---|---|
| 6,452,290 B1* | 9/2002 | Yoshioka et al. | | 307/82 |
| 8,415,827 B2* | 4/2013 | Nagata | | 307/29 |
| 2009/0295227 A1* | 12/2009 | Chang et al. | | 307/46 |

FOREIGN PATENT DOCUMENTS

| | | |
|---|---|---|
| JP | 11098694 A | 4/1999 |
| JP | 2003047155 A | 2/2003 |
| JP | 2004015882 A | 1/2004 |
| WO | WO 2008/047400 A1 | 4/2008 |

OTHER PUBLICATIONS

Machine translation of JP 2005-328622 A, Shikoku Research Institute Inc., Nov. 24, 2005.*
International Search Report dated Jun. 2, 2009 (International Application No. PCT/JP2009/054814).

* cited by examiner

*Primary Examiner* — Jared Fureman
*Assistant Examiner* — Duc M Pham
(74) *Attorney, Agent, or Firm* — Kratz, Quintos & Hanson, LLP

(57) ABSTRACT

The objective of this invention is to provide an autonomous distributed electric power system without depending on a known electric power system. In order to achieve such objective, this invention proposes a following feature: Output frequencies of autonomous grid-connection inverters (104, 164) are to be variably controlled by the control system depending on a change of a stored electric power amount [kWh] of the direct current electric power storage device (102) within an alternating-current autonomous-distributed electric power system; and, such electric power system is built of plural electric power supplier and demander (11, 12, 13, 14, 15) who have electric power storage devices with a system which can control such inverters (104, 164); those inverters are voltage self-exciting as well.

11 Claims, 8 Drawing Sheets

ALTERNATING CURRENT AUTONOMOUS DISTRIBUTED AC POWER SYSTEM

TECHNICAL FIELD

The present invention relates to an alternating current autonomous distributed electric power system in electric power suppliers and demanders which includes an alternating current electricity consumption device, an electric power generation device, and an electric power storage system composed of a direct current electric power storage device having an autonomous grid-connection inverter and to an alternating current autonomous distributed electric power system in which a plurality of electric power suppliers and demanders having the same devices and the same electric power storage system as those described above supply excessive electric power and receive deficient electric power therebetween by mutually connecting a neighboring grid-connection inverter as an electric power supply and a demand control device.

BACKGROUND ART

In a known electric power system, as shown in FIG. 8, "a radial system" in which a large power plant 91 is a top and demanders 92 are a base, is fundamental. In FIG. 8, to secure a plurality of electric power transmission systems, "a loop system" is introduced in some part. This kind of an electric power system is configured, as a single system, in a broad area (for example, several tens of thousands $km^2$) and large scale (several tens GW).

In contrast, recently, attention has been paid to a grid-connection type distributed electric power generation system (refer to, for example, Patent Documents 1 to 3 and the like) with solar generation and a fuel cell. The distributed electric power generation system of a system collaborative type is ordinarily built in an end region or a local region near to the end region of the known radiated electric power system and is premised on interconnection with the electric power system.

Patent Document 1: Japanese Patent Application Laid-Open Publication No. 6-327146
Patent Document 2: Japanese Patent Application Laid-Open Publication No. 2004-15882
Patent Document 3: Japanese Patent Application Laid-Open Publication No. 2002-44870

DISCLOSURE OF THE INVENTION

Problems to be Solved by the Invention

However, in a structure of the known electric power system shown in FIG. 8, since a transportation of electric power is massively carried out over a long distance and is continuously performed a at all times ("simultaneous equal amount rule"), there is a lot of loss. Further, in electric power generation derived from reproducible energy such as solar energy and wind energy, since the reproducible energy ubiquitous, it is difficult to build a large power plant making use of these energies.

The inventor of the invention previously proposed an invention as to an autonomous distributed electric power system internationally publicized as WO/2008/047400 for a purpose of overcoming the above problems.

An object of the invention is to provide an autonomous distributed electric power system of an electric power supplier and demander, in which alternating current electric power obtained by converting electric power stored in a direct current storage device by autonomous grid-connection inverter is demanded by electricity consumption device of an alternating current system as well as which can supply electric power for the above purpose or to provide an alternating current autonomous distributed electric power system in which a plurality of electric power suppliers and demanders, each of which has the above electric power system and which are connected to each other, can get autonomous without depending on a known electric power system. Note that this does not mean to exclude that the system according to the invention coexists with the known electric power system.

Means for Solving the Problem

A first arrangement of the electric power system according to the invention for solving the above problems resides in an alternating current autonomous distributed electric power system of electric power suppliers and demanders including an electric power generation device, a direct current electric power storage device to which electric power is stored by the electric power generation device, autonomous grid-connection inverters (a voltage self-exciting inverter) for connecting the direct current electric power storage device to an alternating current system of an alternating current electric power consumption device, and an electric power storage system composed of a control system for controlling the inverters, wherein the alternating current autonomous distributed electric power system is characterized in that output frequencies of the inverters are variably controlled by the control system according to a change of a stored electric power amount (kWh) of the direct current electric power storage device.

In neighboring electric power suppliers and demanders in the electric power system according to the invention, portions between direct current electric power storage devices of one electric power suppliers and demanders and the autonomous grid-connection inverters and alternating current systems of the other the electric power supplier and demanders are mutually connected through neighboring grid-connection inverters, whether stored electric power amounts of the respective direct current electric power storage device are excessive or deficient are determined by comparing output frequencies of the connected systems, and a grid-connection line tide flow is controlled by control systems of the neighboring grid-connection inverters so that the grid-connection line tide flow flows from a system having a high output frequency to a system having a low output frequency.

Further, the electric power system according to the invention can perform a control for delivering an excessive or deficient stored electric power amount in sectioned group units including groups in each of which a plurality of electric power suppliers and demanders are gathered and mutually connected through neighboring grid-connection inverter likewise the above mentioned.

Further, in the electric power system according to the invention, grid-connection line tide flows of the neighboring grid-connection inverters are controlled based on whether output frequencies of the autonomous grid-connection inverters are larger or smaller than frequencies of neighboring systems detected by the neighboring grid-connection inverters. This point is the same as to the autonomous grid-connection inverters and the neighboring grid-connection inverters.

Here, non-operating or non-communicating dead zones, which can be arbitrarily set or changed, are set to controllers of the autonomous grid-connection inverters or to controllers of the neighboring grid-connection inverters provided as electric power supply and demand control devices as reference levels and the controllers of the inverters are operated based on reference levels of frequencies and grid-connection line tide flows.

Further, as an example of a method for setting the dead zones, in the autonomous grid-connection inverters, a stored electric power amount of the direct current electric power storage device is related to a change of the output frequencies of the inverters, and when a reduction of the stored electric power amount is within a predetermined range, the output frequencies of the inverters may be controlled so that they do not change.

The neighboring grid-connection inverters compare an output frequency of one system with an output frequency of the other system, and when a difference of the frequencies is within a predetermined range, the predetermined range is set as a dead zone and a grid-connection line tide flow is controlled so that it does not flow therethrough.

The control based on the dead zones set as described above can be applied also between groups of a plurality of electric power suppliers and demanders like the above mentioned.

Advantages of the Invention

The invention has an advantage in that an electric power supply and demand status can be transmitted to electric power supply devices and to electric power suppliers and demanders in a system by reflecting whether electric power amounts (kWh) of electric power storage devices in the electric power suppliers and demanders are large or small to output frequencies of the autonomous grid-connection inverters.

When electric power supplies (diesel generators and the like) are introduced to the respective electric power suppliers and demanders, the electric power supplies can be operated in an AFC operation (frequency control operation) mode by the advantage, whereas the advantage can perform a load restriction (demand side management) to electric power suppliers and demanders having a large demand.

In contrast, in a control of neighboring grid-connection inverters, when, for example, a frequency of a system A is compared with a frequency of a system B and a grid-connection line tide flow is flown from a system (A or B) having a high frequency to a system (B or A) having a low frequency, electric power amounts of electric power storage devices of both the systems A and B are equalized with each other.

Incidentally, since a frequency is a global variable in an alternating current system, the grid-connection line tide flow can be controlled only by information of autonomous system ends by detecting the frequency without the need of a special communication line. As an example of a specific countermeasure of the grid-connection line tide flow control, a magnitude of a tide flow proportional to a difference of the frequencies of both the systems is set, and a direction of the tide flow from the system having the high frequency to the system having the low frequency is set as a positive polarity.

BEST MODE FOR CARRYING OUT THE INVENTION

Next, an embodiment of the invention will be described referring to drawings.

Figure 1:
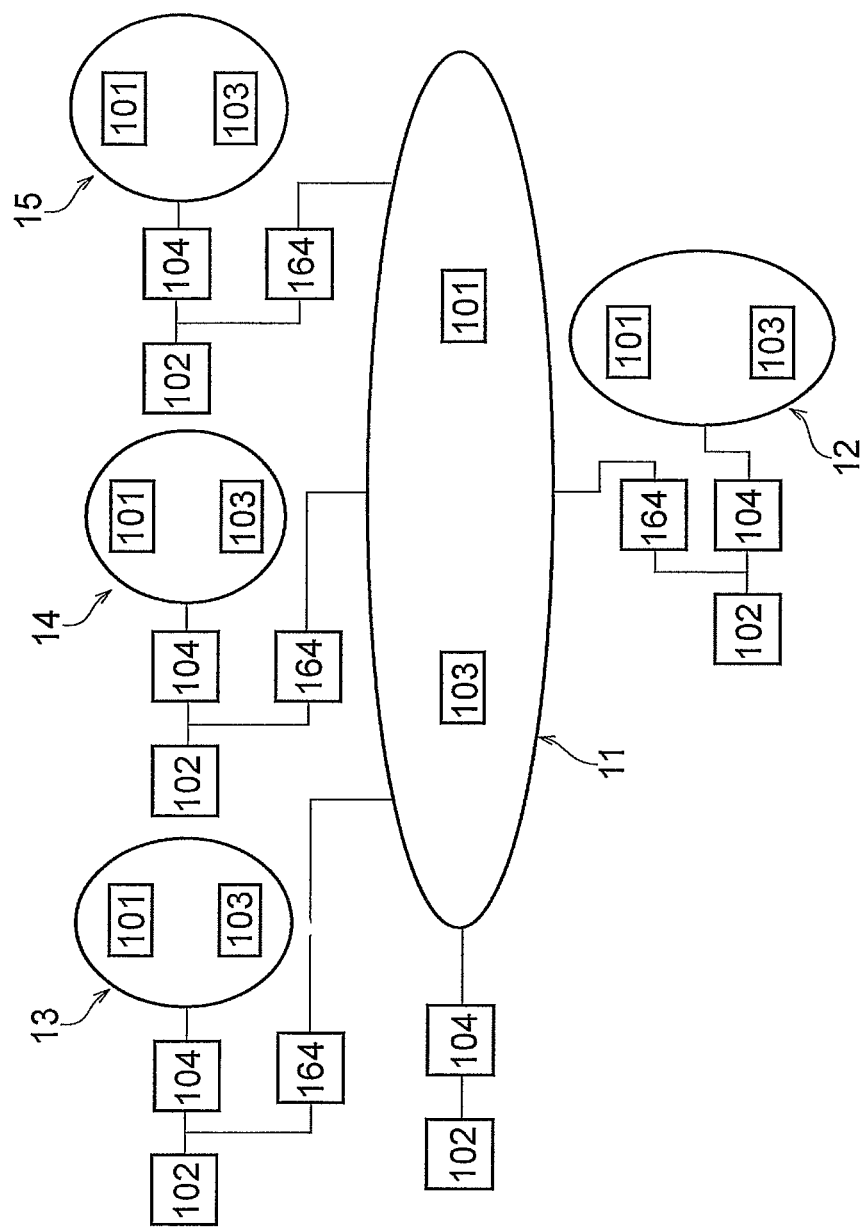
FIG. 1 is a block diagram showing a first example of an arrangement of an electric power system according to the invention.
Figure 2:
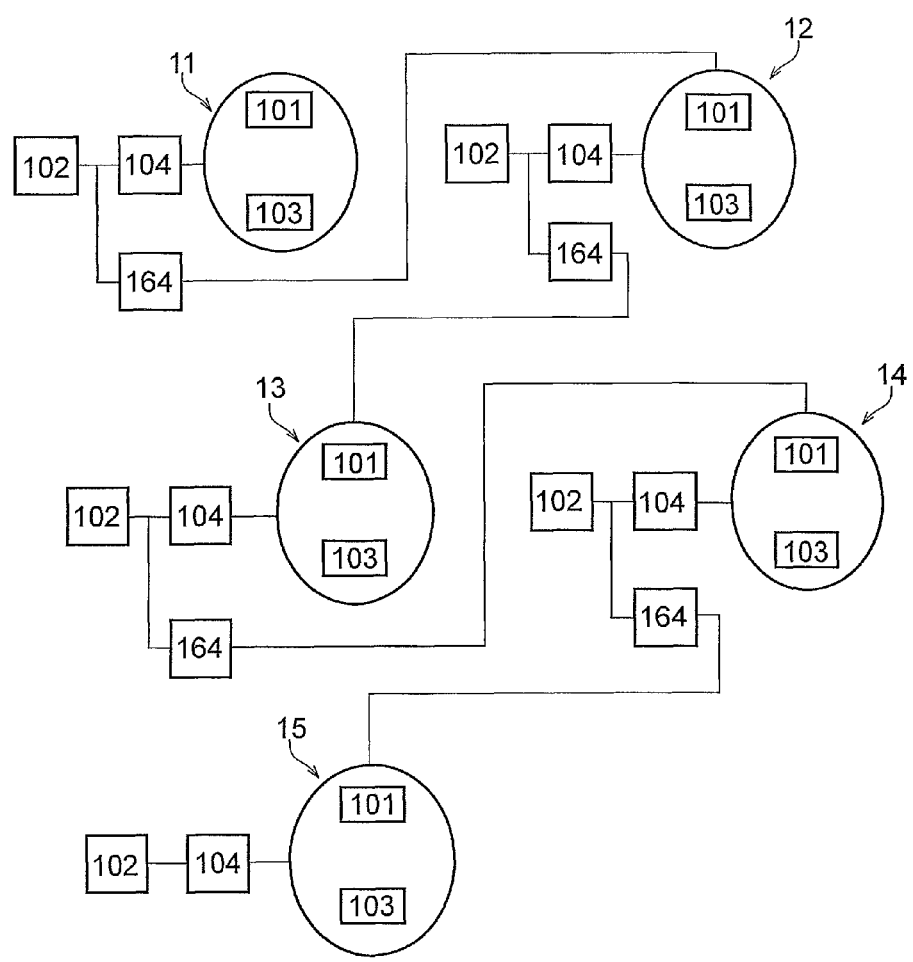
FIG. 2 is a block diagram showing a second example of the arrangement of the electric power system according to the invention.
Figure 3:
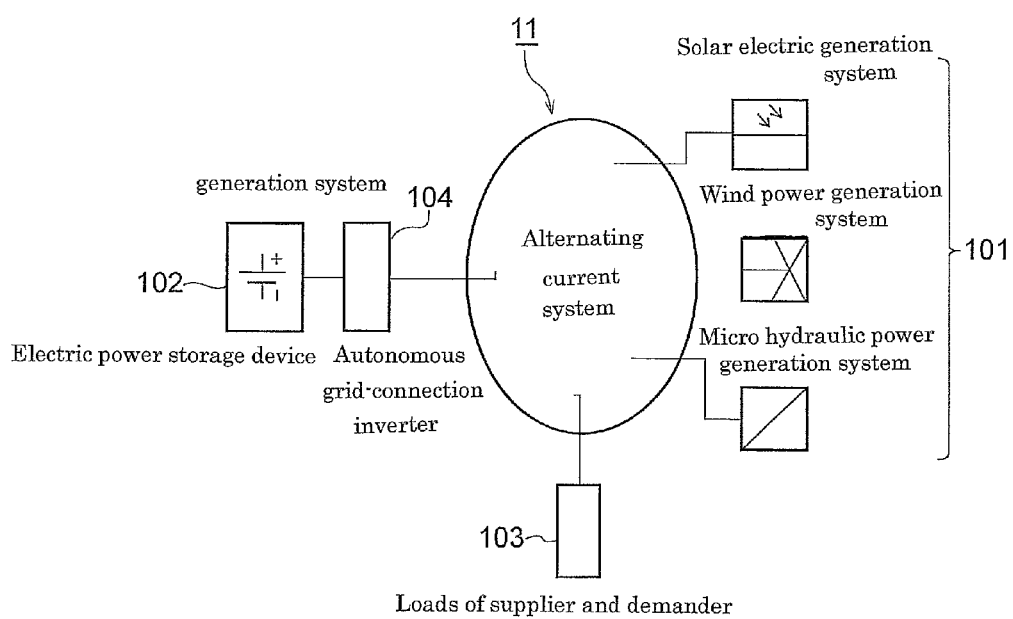
FIG. 3 is a block diagram for explaining an embodiment of one electric power supplier and demander which constitutes the electric power system of FIGS. 1 and 2 corresponding to a first aspect of the invention.
Figure 4:
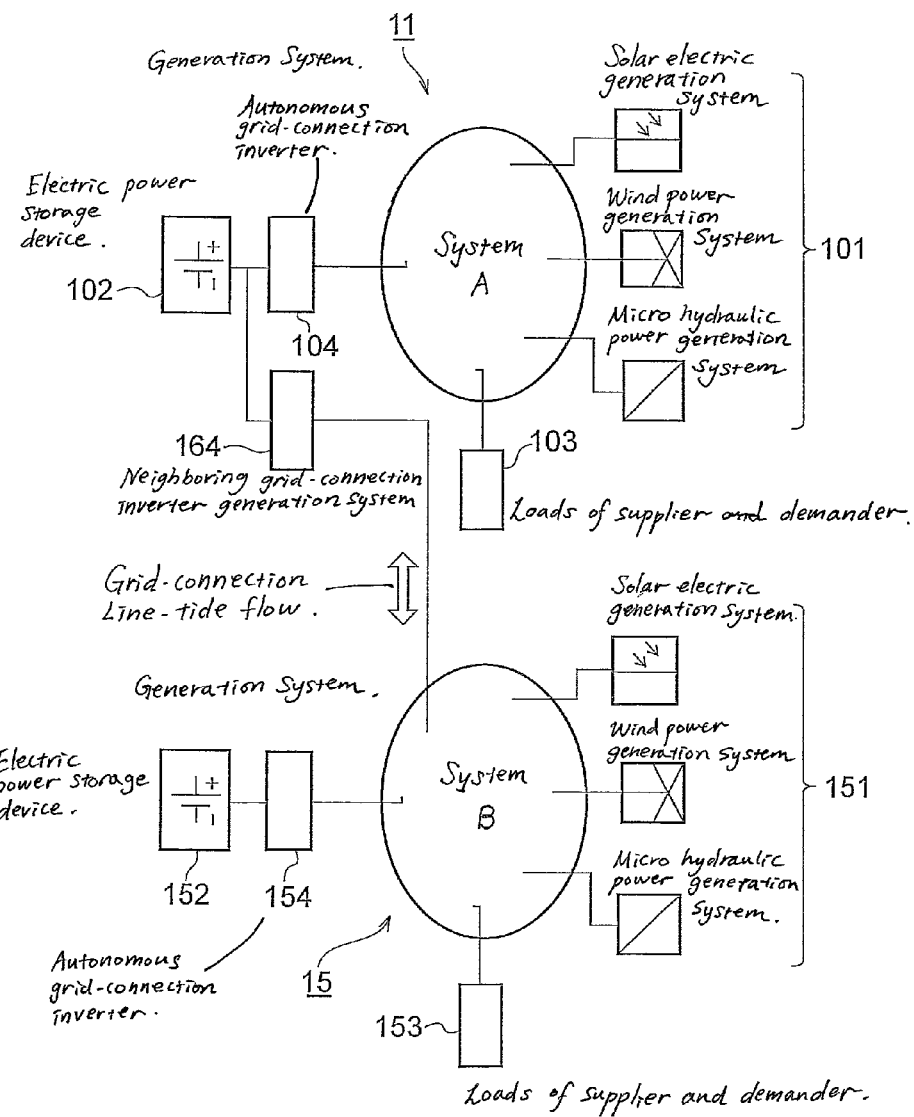
FIG. 4 is a block diagram for explaining an example of a connection mode of adjacent electric power suppliers and demanders corresponding to a second aspect of the invention.
Figure 5:
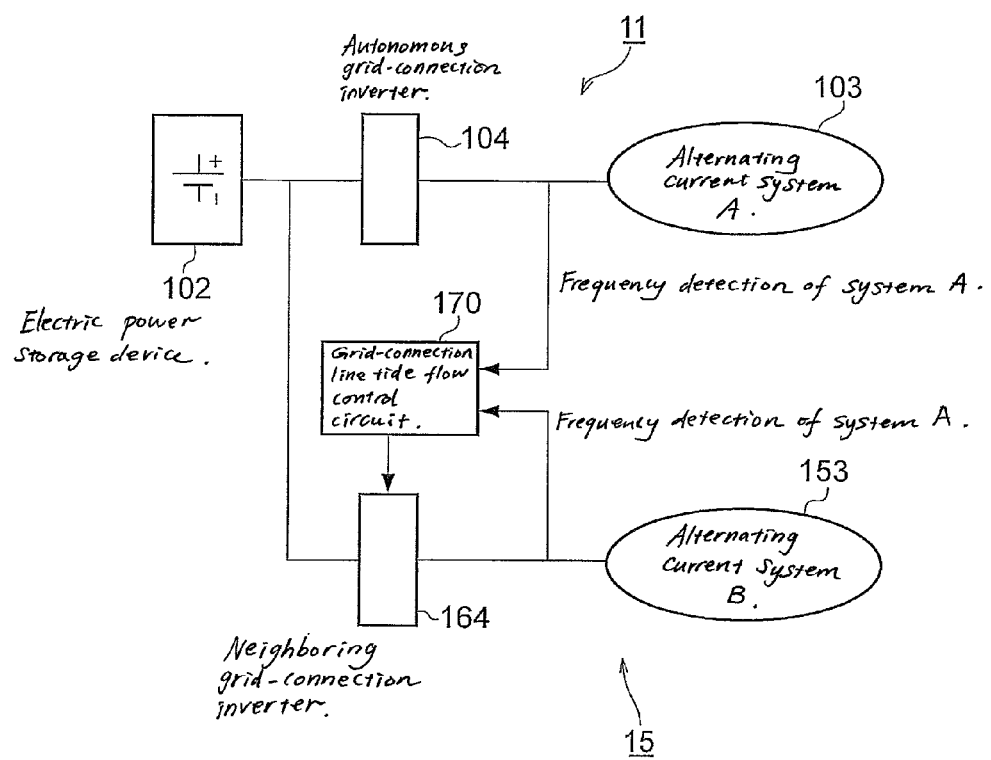
FIG. 5 is a block diagram for explaining an example of a control system in the connection mode of FIG. 4.
Figure 6:
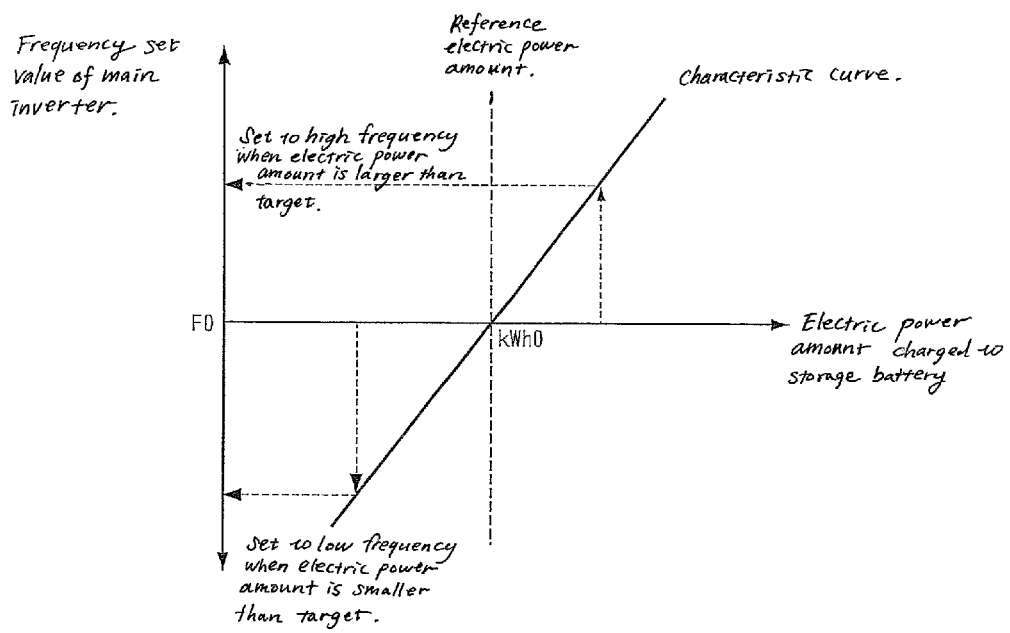
FIG. 6 is a graph showing a drooping characteristic based on an electric power amount of a storage battery.
Figure 7:
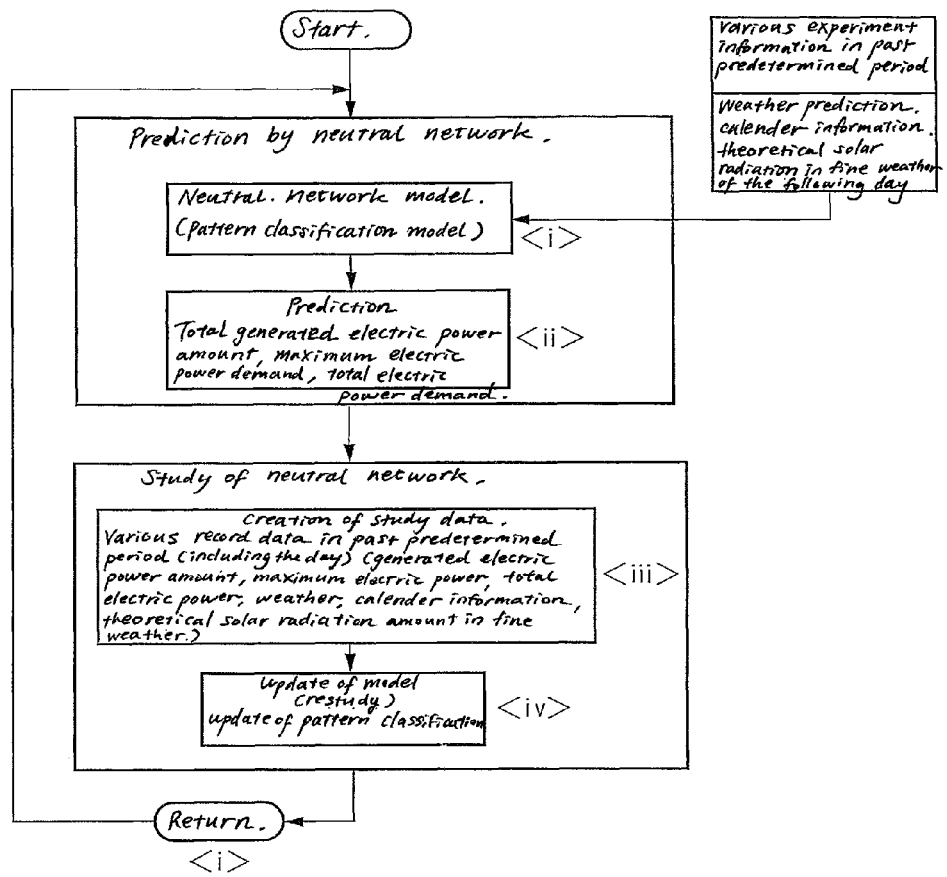
FIG. 7 is a block diagram showing a process view of a neural network.
Figure 8:
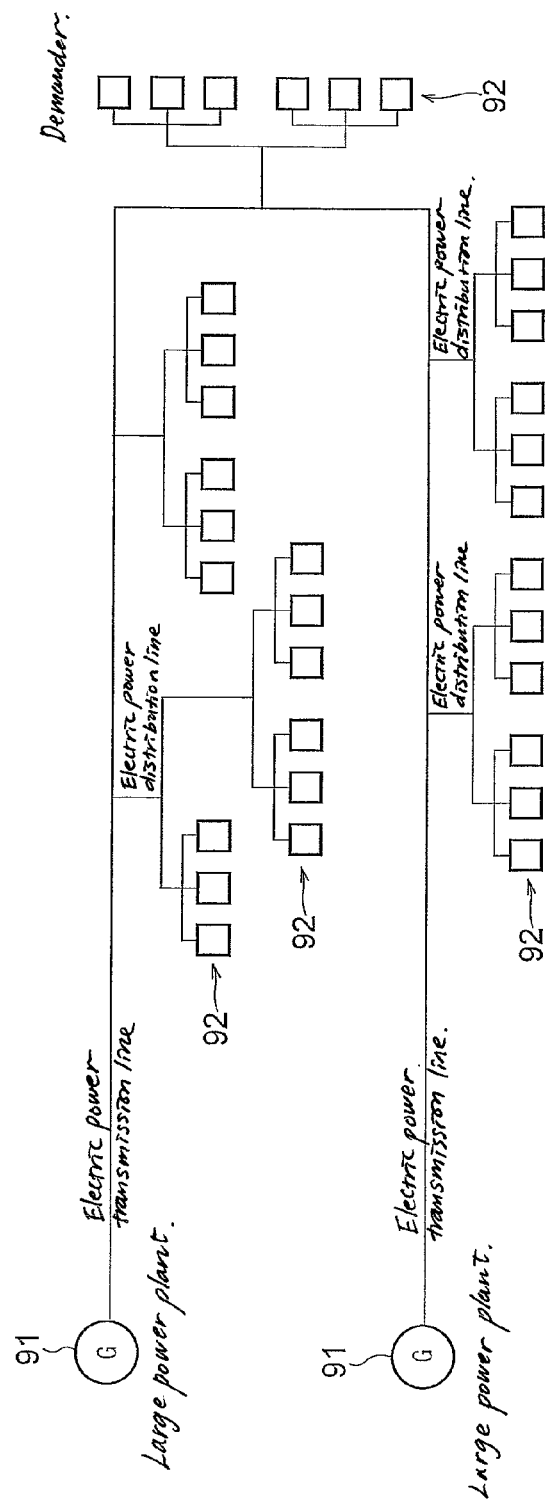
FIG. 8 is a block diagram for explaining a known electric power system.

In attached drawings, FIG. 1 is a block diagram showing a first example of an arrangement of an electric power system according to the invention, FIG. 2 is a block diagram showing a second example of the arrangement of the electric power system according to the invention, FIG. 3 is a block view for explaining an example of an embodiment of one electric power supplier and demander in the electric power system of FIGS. 1 and 2 corresponding to the first aspect of the invention, FIG. 4 is a block diagram for explaining an example of a connection mode between adjacent electric power suppliers and demanders corresponding to the second aspect of the invention, FIG. 5 is a block diagram for explaining an example of an embodiment of a control system in the connection mode of FIG. 4, FIG. 6 is a graph showing a drooping characteristic based on an electric power amount of a storage battery, FIG. 7 is a block diagram showing a process view of a neural network, and FIG. 8 is a block diagram for explaining a known electric power system.

In the electric power system 1 of the invention exemplified in FIGS. 1 and 2, five electric power suppliers and demanders 11 to 15 are connected to one another as an example with the electric power supplier and demander 11 located at a center and the other electric power suppliers and demanders 12 to 15 disposed radially about the electric power supplier and demander 11, and in FIG. 2, the respective electric power suppliers and demanders 11 to 15 are cascade connected to one another.

As exemplified in FIG. 3, each of the electric power suppliers and demanders 11 to 15 has at least one electric power generation device 101 making use of reproducible energy, a direct current electric power storage device 102 such as a NAS battery, a plurality of loads (alternating current electric devices, hereinafter also called "alternating current systems") 103, an autonomous grid-connection inverter 104 as an example of an electric power supply and demand control device disposed among the electric power storage device 102 and the alternating current systems 103. Note that it is assumed that a control system of the inverter 104 is included in a block of the inverter 104. This is the same as to inverters 154 and 164 to be described below. Further, it is also assumed that the electric power suppliers and demanders, which can be interconnected with the electric power system according to the invention has the same devices 101 to 104 as those of the electric power suppliers and demanders 11 to 15 even if they are other electric power suppliers and demanders which are not shown in FIGS. 1 to 3 and that the respective devices are connected to branch-like house wirings.

All the illustrated electric power suppliers and demanders 11 to 15 or any arbitrary electric power supplier and demander, which is interconnected with the electric power system according to the invention, although it is not shown, loads the electric power generation device 101 or/and the electric power storage device 102 in back of a truck or installs the electric power generation device 101 or/and the electric power storage device 102 so that it can be loaded onto back of a truck and can transport it to other electric power supplier and demander and supplies or receives electric power to or from the other electric power supplier and demander.

In the invention, the respective electric power suppliers and demanders are roughly interconnected with one other therebetween. That is, to describe this as to an example referring to FIGS. 1 and 2, the respective electric power suppliers and demanders 11 to 15 are basically of an autonomous type and are interconnected with other electric power supplier and demander so that they are supplied with electric power from the other electric power supplier and demander when electric power shortage occurs, and supply electric power to the other electric power supplier and demander when electric power surplus occurs.

The electric power suppliers and demanders 11 to 15 in the invention are, for example, ordinary houses, collective housings, small-, medium-, and large-scale factories, low-, medium-, and high-rise buildings, and the like. Further, a group of electric power suppliers and demanders, in which a plurality of electric power suppliers and demanders of the ordinary houses, the collective housings, and the like gather, is treated also as the electric power suppliers and demanders 11 to 15 of the invention or any of them.

Typically, the electric power generation device 101 is a DC power supply (hereinafter, called also a direct current electric power storage device) such as a solar electric generation device, a fuel cell, and a NAS battery. Although a reproducible energy electric power generation system such as solar power generation, wind power generation, micro hydraulic power generation, and biomass power generation is used often as the electric power generation device 101, a cogeneration system such as a gas engine system, a gas turbine system, and a fuel cell system may be used. Note that since some of electric power generation devices, biomass electric power generation devices, and cogeneration systems employ an AC power supply, they can be used for an alternating current system as they are without converting an alternating current to a direct current. However, they may be also used as a DC power supply by converting an output thereof from AC to DC and storing the converted output to the direct current electric power storage device 102.

Further, although not shown, the electric power generation device 101 and/or the electric power storage device 102 may use a flywheel unit. The electric power storage device 102 includes an electric storage unit composed of a combination of a storage battery and an electric double-layer capacitor. The loads 103 of the alternating current system are AC devices such as an electric light, an air conditioner, a refrigerator, an electromagnetic cooker, and a rice cooker driven by a commercial alternating current power supply.

In the invention, the autonomous grid-connection inverter 104 is used in an example of FIG. 3 as the electric power supply and demand control device to control an ordinary use and supply of electric power in each electric power supplier and demander. The NAS battery system (the storage battery 102 and the inverter 104) of FIG. 2 as an example of the electric power storage device 102 disposed to each electric power supplier and demander of the invention controls a frequency and a voltage of the inverter 104 as described below to control an electric power supply and demand in each electric power supplier and demander.

That is, the NAS battery system (102, 104) operates in a CVCF mode (constant voltage control/constant frequency control mode). In the CVCF mode, since a frequency of an inverter output voltage of the NAS battery can be arbitrarily set as an indefinite variable, the frequency is used as a reference frequency of the electric power generation device 101 which is a rated frequency of the electric power suppliers and demanders.

As a result, it is sufficient to operate the power generation device 101 at a maximum output by keeping the frequency, that is, by controlling the electric power supply and demand in the electric power suppliers and demanders only by the NAS battery system.

In contrast, in the operation of the NAS battery system (102, 104) in the CVCF mode, since the magnitude of an output voltage of the inverter 104 can be also controlled, for example, an output voltage is kept, that is, ineffective electric power is controlled by also the electric power generation device 101 having a control function in association with a control performed by the NAS battery system. Specifically, the control is assigned in consideration of a drooping characteristic according to rated capacities of the electric power generation device 101 and the electric power storage device 102.

Since the electric power supply and demand can be controlled in the respective electric power suppliers and demanders, when, for example, an electric power surplus occurs in the electric power supplier and demander 11 of FIGS. 1 and 2, that is, when it is detected by the control system provided with the inverter 104 that an electric power amount used by the loads 103 is reduced as well as the electric power storage device 102 is fully charged or almost fully charged as a specific example, electric power generated by the electric power generation device 101 is supplied to other electric power supplier and demander having an electric power shortage through the neighboring grid-connection inverter 164.

In the electric power supply, electric power may be supplied by also moving the electric power generation device 101 or the electric power storage device 102 of the electric power supplier and demander having the electric power surplus to a vicinity of the electric power supplier and demander having the electric power shortage.

In contrast, when an electric power shortage occurs in the electric power supplier and demander 11 as an example, the neighboring grid-connection inverters 164 disposed between the respective electric power suppliers and demanders as the electric power supply and demand devices detect, for example, that an electric power amount used by the loads 103 abruptly increases by the controllers of the inverters 164 for controlling a frequency or/and a voltage. Then, electric power is supplied to an electric power delivery device of the electric power supplier and demander 11 from any of the other electric power suppliers and demanders 12 to 15 in which an electric power surplus occurs through the neighboring grid-connection inverters 164 as the electric power supply and demand devices so that the loads 103 can be driven by the electric power or the electric power can be stored in the electric power storage device 102.

Next, an example of delivery of excessive or deficient electric power between the electric power suppliers and demanders 11 and 15 will be described referring to FIG. 4.

It is assumed that the other electric power supplier and demander 15 exemplified in FIG. 4 has an electric power generation device 151, a direct current electric power storage device 152, the autonomous grid-connection inverter 154 as the electric power supply and demand device, and an alternating current electric device 153. The power generation device 151 is typically a medium and small scale facility of stream power, hydraulic power, wind power, and the like including a cogenerator and a biomass power generation facility, and, although the direct current electric power storage device 152 is typically a secondary battery, it may be also a combination of a secondary battery and an electric double-layer capacitor. The electric power supplier and demander 15 of FIG. 4 can supply electric power to the autonomous alternating current system 153 through the autonomous grid-connection inverter 154 which is the same as that of the electric power supplier and demander 11 of FIG. 3. Further, the electric power supplier and demander 15 of FIG. 4 can be supplied with electric power also from between the other electric power suppliers and demanders 12 to 14 in addition to the electric power supplier and demander 11. Although electric power is delivered between the electric power suppliers and demanders 11 and 15 through the neighboring grid-connection inverter 164 as shown in FIG. 4, it can be delivered by also carrying the electric power generation device 101 and electric power storage device 102, which are movable, of the electric power supplier and demander 11 to the electric power supplier and demander 15 as described above.

In FIG. 4, the electric power, which is delivered between the electric power suppliers and demanders 15 and 11 is, for example, electric power generated by the electric power generation device 151 or electric power stored in the electric power storage device 152, and the electric power, which is supplied from the electric power supplier and demander 11 to the electric power supplier and demander 15, is stored in the electric power storage device 152.

In the electric power system according to the invention, when electric power is delivered between the respective electric power suppliers and demanders through the neighboring grid-connection inverters 164 (delivery of electric power), a plurality of electric power generation devices including cogenerators and biomass electric power generation devices in the respective electric power suppliers and demanders can be automatically or manually controlled based on values of a forecast weather, a predicted electric power demand, a predicted heat demand, and the like or based on values set by the respective electric power suppliers and demanders.

Further, the respective electric power suppliers and demanders 11 to 15 can set or change an operating condition of the neighboring grid-connection inverter 164 disposed between the respective electric power suppliers and demanders 11 to 15 referring to information (frequencies or voltages) from the respective adjacent grid-connection inverters 164 of the other electric power suppliers and demanders as well as based on amounts of electric power consumption predicted by the respective electric power suppliers and demanders.

In the respective electric power generation devices 101 and 151 exemplified in FIG. 4, for example, solar electric power generation devices may be individually controlled by conditioners, and fuel batteries and micro cogenerators may be individually controlled by power conditioners and the like.

In the electric power system according to the invention, the electric power generation devices 101 and 151 in a set of the electric power suppliers and demanders 11 and 15 can be optimally controlled in their entirety by integrally controlling control elements common to the respective electric power generation devices 101 and 151 by the neighboring grid-connection inverters 164 used as the electric power supply and demand devices and by individually controlling control elements inherent to the respective electric power generation devices 101 and 151.

Incidentally, in each of the conventional electric power generation devices such as a solar electric power generation device, and a fuel cell, a full output and a system connection are only controlled by respective power conditioners. However, the invention is arranged such that electric power to be supplied and demanded can be equalized making use of a flywheel unit and the like between a zero output and a full output of the respective electric power generation devices optionally controlled by the autonomous grid-connection inverters 104 and 154.

Note that in the electric power storage devices 102 and 152, the secondary battery, for example, the NAS battery is typically used simply as a DC power supply. However, in the electric power system according to the invention, electric power can be supplied to the autonomous electric device through the autonomous grid-connection inverters 104 and 154 using the storage battery (secondary battery) and the electric double-layer capacitor together to the electric power storage devices 102 and 152.

When the storage battery and the electric double-layer capacitor are used together, it is possible to rationally cope with diversification of an electric power demand mode in the respective electric power suppliers and demanders or diversification of an electric power supply mode in the respective electric power suppliers and demanders by controlling a selective use of the storage battery and the electric double-layer capacitor according to, for example, electric power storage characteristics and discharge characteristics by the autonomous grid-connection inverters 104 and 154.

Further, various types of electric devices as the loads 103 (alternating current systems) disposed to the electric power supplier and demander 11 are operated individually by simply turning on and off electric power individually. This is the same as to the other electric power suppliers and demanders 12 to 15.

However, the electric power system according to the invention can equalize an electric power consumption by, as an example, setting respective electric devices, for example, a refrigerator, an air conditioner, a TV, and the like, which constitute the loads 103 in the electric power supplier and demander 11 to the controller of the autonomous grid-connection inverter 104 in a start-up preference order, an order of a magnitude of start-up electric power (in an order of a larger magnitude or in an order opposite to the larger magnitude), and the like and controlling, for example, an order of start-up (or an order of stop) in the set order or in the order of a larger amount of start-up electric power.

Further, when the electric devices 103 having a large amount of start-up electric power are started, the electric power supply and demand control device can be operated so that the electric power is supplied from the storage battery having the electric double-layer capacitor or from the flywheel unit.

Further, as to an electric power demand at ordinary home and its peak whose prediction is difficult, an electric power storage device (not shown) such as a battery, by which each of the electric devices 103 such as a refrigerator, an air conditioner, and the like of each home can be operated for, for example, two hours, is mounted on each electric device 103 so that an electric power shortage at the peak of demand can be compensated in the electric power supplier and demander. The method also contributes to equalization of the electric power consumption.

When the electric power consumption is equalized by controlling the start-up preference order and the like as described above, an excessively large current, which is liable to flow to the controller of the inverter 104 and to the respective electric devices 103 in the start-up, can be dispersingly controlled. As a result, a lifespan of the inverter 104 itself, the respective electric devices, and wiring parts such as wirings for connecting between the respective electric devices can be increased.

Further, as exemplified in FIG. 5, when a frequency of the electric power supplier and demander 11 and a frequency of the electric power supplier and demander 15 are detected by a grid-connection line tide flow control circuit 170 and the neighboring grid-connection inverter 164 is controlled based on a result of the detection, it is possible to perform a control so that a pulsation is not caused in a grid-connection line tide flow or to make it difficult that the pulsation is caused in the grid-connection line tide flow, which is useful also to secure a more stable operation in the respective electric power suppliers and demanders.

Further, when an electric-power supply and demand is controlled between the respective electric power suppliers and demanders and DC electric power used therebetween is converted to AC electric power, since a waiting state of TV and waiting operations of other devices, for example, can be made unnecessary, an useless electric power consumption can be suppressed.

An object of interconnecting the electric power suppliers and demanders 11 and 15 exemplified in FIGS. 4 and 5 by the neighboring grid-connection inverter 164 is to equalize electric power amounts charged to the direct current electric power storage devices 102 and 153 installed to the respective electric power suppliers and demanders 11 and 15 and an electric power amount charged to the direct current electric power storage device composed of the autonomous grid-connection inverters 104 and 154, for example, the NAS battery system therebetween. A trouble of an electric power supply, which may occur in one of the electric power suppliers and demanders 11 and 15, can be previously avoided by the grid-connection, and reliability of a current supply and demand can be improved. This is the same between the electric power suppliers and demanders other than the above electric power suppliers and demanders.

Next, as to a control mode of the grid-connected-line tide flow between neighboring systems, specifically, as to how much electric power amount is flown to an electric power supplier and demander in which direction, the neighboring grid-connection inverters 164 disposed together with the NAS battery systems 102, 104 and the like perform the control mode.

In the embodiment, the grid-connection-line tide flow is controlled so that it flows from a NAS battery (an example of the electric power storage device, this is the same as to the following description) in which a larger electric power amount is charged to a NAS battery in which a smaller electric power amount is charged. For this purpose, it is necessary to detect and find a charged electric power amount of the NAS battery of an electric power supplier and demander adjacent to the grid-connection inverter 164. To detect whether large electric power amounts are charged to the NAS batteries, frequencies of voltages generated by the respective autonomous grid-connection inverters attached to the respective NAS batteries are detected and reflected to the charged electric power amounts. When a large mount of electric power is charged in an electric power supplier and demander, a rated frequency of the electric power supplier and demander is set to a high level, whereas a small mount of electric power is charged, the rated frequency of the electric power supplier and demander is set to a low level.

When the control mode described above is employed, it is sufficient in a control of the neighboring grid-connection inverter to compare a frequency of one electric power supplier and demander with a frequency of other electric power supplier and demander and to flow a tide from an electric power supplier and demander having a high frequency to an electric power supplier and demander having a low frequency. Since the frequency is a global variable in the alternating current system, the tide flow can be controlled only by the information (frequency) of an autonomous terminal by detecting and controlling the frequency without the need of a special communication line. Incidentally, a magnitude of the grid-connected-line tide flow is set so that it is proportional to a difference of frequencies between both the electric power suppliers and demanders as an idea.

FIG. 6 schematically shows a drooping characteristic based on an electric power amount of a direct current storage battery.

In FIG. 6, a vertical axis (Y-axis) shows a set value of a frequency of an autonomous grid-connection inverter, and a horizontal axis (X-axis) shows a charged electric power amount (kWh) of a storage battery. When the drooping characteristic is drawn by a right ascending (left descending) characteristic line passing through a point showing a reference electric power amount in FIG. 6, a frequency of an inverter is set to a high side at the time the electric power amount is larger than a target (reference electric power) and set to a low side at the time the electric power amount is smaller than the target (reference electric power).

When the autonomous grid-connection inverters of the respective electric power suppliers and demanders are controlled by the drooping characteristic based on the electric power amount of the storage battery, electric power amounts can be equalized according to capacities of storage batteries provided with the respective electric power suppliers and demanders.

When the magnitudes of the charged electric power amounts of the storage batteries are reflected to the frequencies of the respective electric power suppliers and demanders, since the same electric power supplier and demander has the same frequencies even if they are detected in any portions, information of an electric power supply and demand status can be transmitted to electric power supplies and loads in the respective electric power suppliers and demanders without the need of a special communication line. With this operation, an electric power supply and demand can be controlled on the electric power supply side and on the load side of the respective electric power suppliers and demanders.

Features of the electric power system according to the invention will be summarized as described below.

First, in the respective electric power suppliers and demanders, (1) natural energy electric power generation devices (solar light, wind force, micro waterwheel, and the like) are operated and controlled so that they can covert energy being used to electric power at a maximum, (2) The NAS battery and the like are operated as electric power storage means in the CVCF mode, and (3) Frequencies set in the CVCF mode is made variable according to the electric power amounts charged to the electric power storage devices such as the NAS battery. Specifically, when a charged electric power amount is larger than a target value (reference value), the frequency is set higher than a rated frequency, whereas when the charged electric power amount is smaller than the target value (reference value), the frequency is set lower than the rated frequency.

To control a plurality of the respective electric power suppliers and demanders by interconnecting them, in the invention, the electric power storage device as an electric power storage means is provided with the neighboring grid-connection inverter in addition to the autonomous grid-connection inverter. Between two electric power suppliers and demanders interconnected to the neighboring grid-connection inverter, frequencies of both the electric power suppliers and demanders are detected and interconnecting electric power is controlled according to a difference of the frequencies. That is, electric power is supplied from an electric power supplier and demander having a high frequency to an electric power supplier and demander having a low frequency.

In the invention, a dead zone of a certain width is set to reference values (target electric power values) of stored (charged) electric power amounts of the respective electric power storage devices in the respective electric power suppliers and demanders or to a reference frequency (target frequency) set to the autonomous grid-connection inverter.

The dead zone prevents a grid-connection tide flow from flowing between both the electric power suppliers and demanders to supply (deliver) electric power at excessively many times or excessively frequently.

Since a method described below can be used to set the dead zone, the method will be described below.

A charged electric power amount (or frequency), which is used as a reference for determining a tide flow direction in the electric power system according to the invention, obtains a predicted value by a neural network of a control block exemplified in FIG. 7. That is, first, a following day's total generated electric power amount, a maximum demanded electric power amount, and a total demanded electric power amount of each electric power supplier and demander are predicted. The prediction will be described below.

First, "a total solar-cell-generated electric power amount," "a day's maximum demanded electric power amount" and "a day's total demanded electric power amount" of a following day of each electric power supplier and demander are estimated (predicted). The estimation is performed by inputting following day's weather forecast information and past weather forecast information of an area of each electric power supplier and demander and an area adjacent to the area, records of "the total solar-cell-generated electric power amount", "the day's maximum demanded electric power amount", and the day's total demanded electric power amount", calendar information (the days of the week, high days and holidays), and a theoretical solar radiation amount to a hierarchical neural network. The neural network performs a non-linear interpolating estimation by studying climate patterns of the area and the peripheral area of each electric power supplier and demander and a combination of the record data of a total generated electric power amounts and demanded electric power of the areas as patterns and by matching a following day's weather forecast pattern with a past weather forecast pattern.

In the pattern study, since a model is updated using observation data every day, an estimation accuracy is continuously improved day by day. Further, environmental changes (a total solar cell capacity, a change of demanders, a long term climate variation, a medium term abnormal climate, and the like) in the respective areas of the electric power suppliers and demanders are also coped with by independently updating the model. Note that it is not necessary to construct database of the respective suppliers and demanders in areas of the respective electric power demanders.

The above prediction will be performed by the following procedure.

(i) A neural network model for predicting a generated electric power amount and a demanded electric power amount is prepared (when the model does not exist, a rough model is created by dummy data). Past record data, a following-day's weather forecast, calendar information, and a solar radiation amount (theoretical value) of a day in fine weather are input to the model. (At the time, it is preferable to add also weather information of a nearby area in addition of the aforementioned area to improve a prediction accuracy.)

(ii) A total generated electric power amount, a maximum demanded electric power amount, and a total demanded electric power amount are predicted (non-linear interpolating estimation by pattern matching).

(iii) Actual record data is collected for a restudy of the neural network.

Preparation for the restudy of the neural network is performed by collecting record data. The record data is various types of record data (generated electric power amount, maximum electric power, total electric power, weather, calendar information, theoretical solar radiation amount in fine weather) in a past predetermined period including a current day.

(iv) The neural network is caused to perform the restudy using back propagation (error back propagation algorithm).

(v) A total generated electric power amount, a maximum demanded electric power amount, and a total demanded electric power amount of a following day are predicted by an updated neural network.

An accuracy of the prediction data is improved by repeating (i) to (v).

When the prediction values (data) of the total generated electric power amount, the maximum demanded electric power amount, and a total electric power amount of the following day in the respective electric power suppliers and demanders are obtained as described above, charged electric power amounts (target values) used as references of the respective electric power suppliers and demanders are determined, respectively, and further dead zones each having an allowance before and behind the respective target values are set.

In the respective electric power suppliers and demanders 11,15, and the like, an electric power network is formed between the other electric power suppliers and demanders using the neighboring grid-connection inverters 164 used as the electric power supply and demand control devices as nodes. Accordingly, the autonomous grid-connection inverters 104 (154) and the neighboring grid-connection inverters 164 have a function for delivering electric power between the respective electric power suppliers and demanders 11 and 15.

Incidentally, in the electric power system according to the invention exemplified in FIGS. 1 and 2, a group, in which a plurality of electric power suppliers and demanders are appropriately gathered, can be treated as the electric power suppliers and demanders 11 to 15 or any one of them. It is assumed that the group of the electric power suppliers and demanders is composed of about several tens of homes to 10,000 homes. Further, it is also possible to form the group of the electric power suppliers and demanders of a unit of "town", a unit of "city", a unit of "prefecture", and the like.

Although not shown, groups of the electric power suppliers and demanders are interconnected through neighboring grid-connection inverters. The mutual connection includes a connection in which the groups of the electric power suppliers and demanders are hierarchized in a vertical direction.

Respective high order hierarchies of the group of the electric power suppliers and demanders are mutually connected to respective low order hierarchies thereof through the neighboring grid-connection inverters.

In the embodiment of the invention, although not shown, the respective electric power suppliers and demanders may be connected in a branch mode and further may employ a pattern in which they are connected in a star mode, a pattern in which they are connected in a net mode, and further in a mode of combination of these modes.

INDUSTRIAL APPLICABILITY

The invention can provide an autonomous electric power system in which a plurality of electric power suppliers and demanders are mutually connected through neighboring grid-connection inverters and moreover which does not need an information transmission communication line between the respective electric power suppliers and demanders and does not depend on a conventionally known existing electric power system.

REFERENCE NUMERALS 1 electric power system according to the invention
11, 12, 13, 14, 15 electric power supplier and demander
104, 164 grid-connection inverter
101 electric power generation device
102 electric power storage device (NAS battery and the like)
103 load (alternating current system)

The invention claimed is:

1. An alternating current autonomous distributed electric power system of electric power suppliers and demanders including an electric power generation device, a direct current electric power storage device to which electric power is stored by the electric power generation device, autonomous grid-connection inverters for directly connecting the direct current electric power storage device to an alternating current system of an alternating current electric power consumption device, and an electric power storage system composed of a control system for controlling the inverters, characterized in that output frequencies of the inverters are continuously and variably controlled by the control system according to a change of a stored electric power amount (kWh) of the direct current electric power storage device.

2. An alternating current autonomous distributed electric power system, characterized in that in neighboring electric power suppliers and demanders of the autonomous distributed electric power system according to claim 1, portions between direct current electric power storage devices of one electric power suppliers and demanders and the autonomous grid-connection inverters and alternating current systems of the other the electric power supplier and demanders are mutually connected through neighboring grid-connection inverters, whether stored electric power amounts of the respective direct current electric power storage device are excessive or deficient are determined by comparing output frequencies of the connected systems, and a grid-connection tide flow is controlled by control systems of the neighboring grid-connection inverters so that the grid-connection tide flow flows from a system having a high output frequency to a system having a low output frequency.

3. An autonomous distributed electric power system, characterized in that in the autonomous distributed electric power system according to claim 2, grid-connection tide flows of the neighboring grid-connection inverters are controlled based on whether output frequencies of the autonomous grid-connection inverters are larger or smaller than frequencies of neighboring systems detected by the neighboring grid-connection inverters.

4. The alternating current autonomous distributed electric power system according to claim 2, wherein an electric power supplier and demander includes a group of a plurality of electric power suppliers and demanders which are gathered and mutually connected through the neighboring grid-connection inverters.

5. The alternating current autonomous distributed electric power system according to claim 2, wherein non-operating or non-communicating dead zones are formed to controllers of the autonomous grid-connection inverters or to controllers of the neighboring grid-connection inverters provided as electric power supply and demand control devices and the controllers of the inverters are operated based on reference levels that can arbitrarily set or change output frequencies or output voltages.

6. The alternating current autonomous distributed electric power system according to claim 5, wherein, in the autonomous grid-connection inverters, a stored electric power amount of the direct current electric power storage device is related to a change of the output frequencies of the inverters in the inverter, and when a reduction of the stored electric power amount is within a predetermined range, the output frequencies of the inverters are controlled so that they do not change.

7. The alternating current autonomous distributed electric power system according to claim 5, wherein the neighboring grid-connection inverters compare an output frequency of one system with an output frequency of the other system, and when a difference of the frequencies is within a predetermined range, the predetermined range is set as a dead zone and a grid-connection tide flow is controlled so that it does not flow therethrough.

8. The alternating current autonomous distributed electric power system according to claim 3, wherein an electric power supplier and demander includes a group of a plurality of electric power suppliers and demanders which are gathered and mutually connected through the neighboring grid-connection inverters.

9. The alternating current autonomous distributed electric power system according to claim 3, wherein non-operating or non-communicating dead zones are formed to controllers of the autonomous grid-connection inverters or to controllers of the neighboring grid-connection inverters provided as electric power supply and demand control devices and the controllers of the inverters are operated based on reference levels that can arbitrarily set or change output frequencies or output voltages.

10. The alternating current autonomous distributed electric power system according to claim 9, wherein, in the autonomous grid-connection inverters, a stored electric power amount of the direct current electric power storage device is related to a change of the output frequencies of the inverters in the inverter, and when a reduction of the stored electric power amount is within a predetermined range, the output frequencies of the inverters are controlled so that they do not change.

11. The alternating current autonomous distributed electric power system according to claim 9, wherein the neighboring grid-connection inverters compare an output frequency of one system with an output frequency of the other system, and when a difference of the frequencies is within a predetermined range, the predetermined range is set as a dead zone and a grid-connection tide flow is controlled so that it does not flow therethrough.

* * * * *